(12) United States Patent
Yoon et al.

(10) Patent No.: US 10,596,601 B2
(45) Date of Patent: Mar. 24, 2020

(54) IMAGING SYSTEM FOR SORTING POULTRY MEAT WITH WOODEN BREAST MYOPATHY

(71) Applicant: The United States of America, as represented by the Secretary of Agriculture, Washington, DC (US)

(72) Inventors: Seung C. Yoon, Athens, GA (US); Brian C. Bowker, Bogart, GA (US); Hong Zhuang, Bishop, GA (US); Kurt C. Lawrence, Bogart, GA (US); Gerald W. Heitschmidt, Athens, GA (US); Tae Sung Shin, Athens, GA (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 60 days.

(21) Appl. No.: 15/980,407

(22) Filed: May 15, 2018

(65) Prior Publication Data

US 2018/0333752 A1 Nov. 22, 2018

Related U.S. Application Data

(60) Provisional application No. 62/508,623, filed on May 19, 2017.

(51) Int. Cl.
*A22C 17/00* (2006.01)
*B07C 5/36* (2006.01)
(Continued)

(52) U.S. Cl.
CPC .............. *B07C 5/10* (2013.01); *A22C 17/008* (2013.01); *A22C 21/0053* (2013.01); *B07C 5/362* (2013.01); *B07C 2501/0081* (2013.01)

(58) Field of Classification Search
CPC ... A22C 17/00; A22C 17/008; A22C 21/0053; B07C 5/10; B07C 5/362
(Continued)

(56) References Cited

U.S. PATENT DOCUMENTS 5,140,988 A * 8/1992 Stouffer ................. A22B 5/007
600/437
5,659,624 A * 8/1997 Fazzari ................. B07C 5/3422
209/580
(Continued)

FOREIGN PATENT DOCUMENTS

JP 2002281891 10/2002
JP 4020659 12/2007
(Continued)

*Primary Examiner* — Terrell H Matthews
(74) *Attorney, Agent, or Firm* — John D. Fado; Robert Jones

(57) ABSTRACT

The image sorting system sorts normal chicken breast meat fillets from chicken fillets that exhibit wooden breast myopathy (i.e. WB fillets). In the preferred embodiment, a camera and associated controller gather data and construct a digital image of a chicken breast fillet as it travels on a conveyer belt. The digital image is used to calculate a centroid (i.e. center of mass) of the fillet. As the fillet moves over a nose of the conveyer belt and free-falls to a lower conveyor belt, the controller determines the distance between the fillet centroid and a reference point (preferably the conveyer belt axis of rotation). If the distance exceeds a predetermined minimum distance, the fillet is designated a WB fillet.

15 Claims, 13 Drawing Sheets
(10 of 13 Drawing Sheet(s) Filed in Color)

(51) Int. Cl.
*B07C 5/10* (2006.01)
*A22C 21/00* (2006.01)

(58) Field of Classification Search
USPC .................................................. 209/552, 586
See application file for complete search history.

(56) References Cited

U.S. PATENT DOCUMENTS

| | | | | |
|---|---|---|---|---|
| 10,314,511 | B2* | 6/2019 | Meyer | A61B 5/055 |
| 2004/0028777 | A1* | 2/2004 | Koke | B65B 25/065 |
| | | | | 426/129 |
| 2009/0000915 | A1* | 1/2009 | Nadreau | A01K 45/00 |
| | | | | 198/469.1 |
| 2009/0137195 | A1* | 5/2009 | Bottemiller | A22C 17/008 |
| | | | | 452/150 |
| 2012/0307013 | A1* | 12/2012 | Hjalmarsson | A22C 17/0086 |
| | | | | 348/46 |
| 2014/0079291 | A1* | 3/2014 | Johnson | A22C 17/008 |
| | | | | 382/110 |
| 2018/0027848 | A1* | 2/2018 | Blaine | A22C 17/0086 |

FOREIGN PATENT DOCUMENTS

| | | |
|---|---|---|
| KR | 100889487 | 3/2009 |
| KR | 101678488 | 11/2016 |

\* cited by examiner

IMAGING SYSTEM FOR SORTING POULTRY MEAT WITH WOODEN BREAST MYOPATHY

CROSS REFERENCE TO RELATED APPLICATIONS

This application claims the benefit of U.S. Provisional Application No. 62/508,623, filed May 19, 2017, which is incorporated herein by reference in its entirety.

FIELD OF THE INVENTION

The disclosed method and apparatus relates to inspecting poultry meat. Specifically, the method and apparatus described herein relates to inspecting chicken breasts for "wooden"—(or "woody"—) breast myopathy.

BACKGROUND OF THE INVENTION

The increasing occurrence of the woody breast (WB) myopathy is an emerging poultry meat quality problem in broiler-breast meat production. Chicken breasts with this muscle-tissue abnormality, or myopathy have an uncharacteristically hard or rigid feel and/or shape irregularities. The WB myopathy results in decreased fresh meat quality, inferior yield in processed products, diminished nutritional quality, potential product condemnations, and reduced customer/consumer acceptance. WB fillets may also create problems for processors during fillet portioning and further processing due to altered shape and rigidity issues.

Unfortunately, an objective method to rapidly and non-destructively detect the WB myopathy has not been developed. The state-of-the-art technology for diagnosing/identifying WB myopathy is human observation and touch. Consequently, identification is time consuming and subjective. There is no agreed-upon quality standard or easily-measurable characteristic that an inspector can rely on to exactly determine whether a breast fillet is considered to be woody without handling the breast fillet.

The need exists for a system to quickly, accurately, and objectively identify poultry breasts that exhibit the WB myopathy. The system described herein comprises a machine vision system that can be used to identify boneless chicken breasts with WB myopathy in real time as the breasts move down a conventional conveyor. System operators can program the system with a standardized set of criteria so that chicken breasts with WB myopathy are identified based on an agreed-upon standard. The data regarding all inspected chicken breasts can be recorded and further scrutinized (as appropriate) by meat inspectors, quality control personnel, and/or potential/actual customers.

SUMMARY OF THE INVENTION

This disclosure is directed to a method of sorting poultry meat. In accordance with the preferred embodiment of the method, a boneless poultry breast fillet is placed on a continuously moving upper conveyor. A digital camera continuously acquires digital images of the fillet and communicates the data to a controller. The controller uses the digital images to calculate physical characteristics of the fillet. The path of the conveyor is structured so that the fillet proceeds off the end of the upper portion of the conveyor and falls to a lower portion of the conveyor. The controller makes a decision regarding whether the fillet has woody breast myopathy based on the changes in the fillet's physical characteristics as the fillet proceeds off the end of the upper conveyor.

This disclosure is also directed to a system for determining whether a poultry breast fillet has the woody breast myopathy. The preferred embodiment of the system comprises a conveyor configured to transport a poultry fillet. The path of the conveyor is structured so that the conveyor has an intermediate end, followed by a substantial vertical drop.

In operation, as the fillet moves down the upper conveyor, a camera continuously acquires digital images of the fillet from a viewpoint perpendicular to the direction of the movement of the fillet. At the intermediate end of the conveyor, the fillet falls (i.e. drops) off an upper portion of the conveyor and down to a lower portion of the conveyor The digital images are communicated to a controller that continuously calculates physical characteristics of the fillet. The controller makes a decision regarding whether or not the fillet has the woody breast myopathy based on the calculated and observed physical characteristics of the fillet.

BRIEF DESCRIPTION OF THE DRAWINGS

The US Patent and Trademark Office patent or application file associated with this disclosure contains at least one drawing executed in color. Copies of this patent or patent application publication with color drawing(s) will be provided by the Office upon request and payment of the necessary fee.

DETAILED DESCRIPTION OF PREFERRED EMBODIMENTS

An important purpose of the method and apparatus described herein is to distinguish normal boneless chicken breast fillets from WB fillets. For the purposes of this disclosure, 'normal fillet' is a fillet without any degree of WB myopathy or other rigidity defects, such as a hardened area of breast meat, and/or a generally rigidity of the meat of the fillet. The inventors focused on the physical characteristics that made normal fillets distinguishable from WB fillets, and determined that these physical characteristics fell into at least three main categories. The inventors then designed a method/embodiment to identify WB myopathy based on these three methods/embodiments.

The first embodiment is (at least nominally) the generally preferred embodiment. The first embodiment focuses on the flexibility of the fillet, as indicated by the movement of the fillet's centroid. The second embodiment focuses on the external "bending energy"/response (i.e. rigidity or flexibility) of the fillet, and the third embodiment relates to clearly identifiable differences in the shape of WB fillets (bulging projections on the fillet surface), relative to normal fillets.

These physical characteristics can be tested/measured in multiple ways to predict the wooden breast myopathy with varying levels of accuracy. In this disclosure, the physical characteristics for the first two embodiments are measured by observing and processing (via digital images) changes in the physical parameters of the fillets as the fillets "fall" off an intermediate end of a conveyer. The physical changes include at least the movement of the fillet's centroid and/or the bending energy exhibited by the fillet. The physical characteristics for the third embodiment are measured via a (preferably) three dimensional image scan, although a two dimensional scan may also be used. Using the described methods in combination with each other can enhance the detection accuracy above that of a single parameter test/measurement. Consequently the methods described herein can be combined with each other or with other known methods to enhance the accuracy of the tests.

Figure 1:
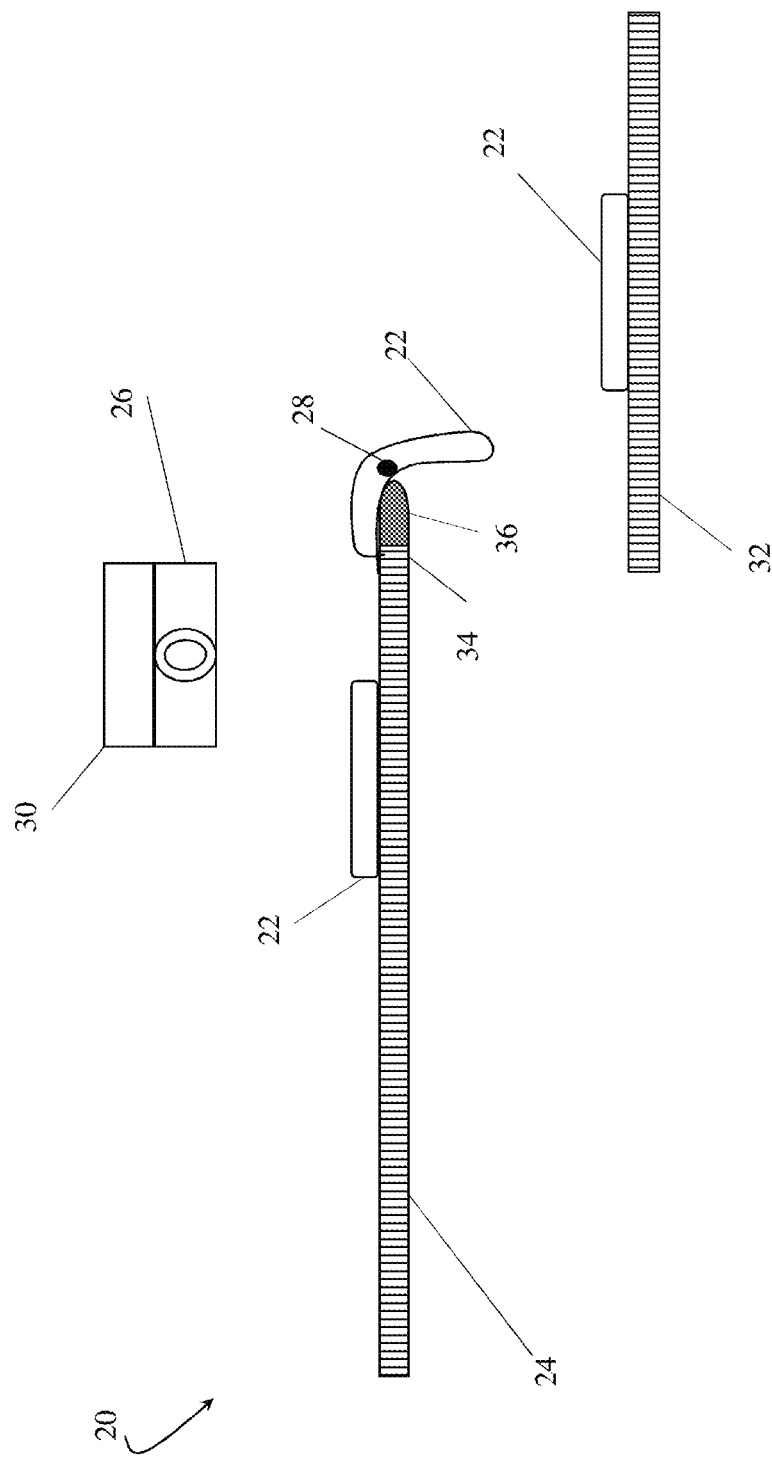
FIG. 1 is a schematic of the preferred embodiment of the imaging system for sorting poultry meat.
Figure 5:
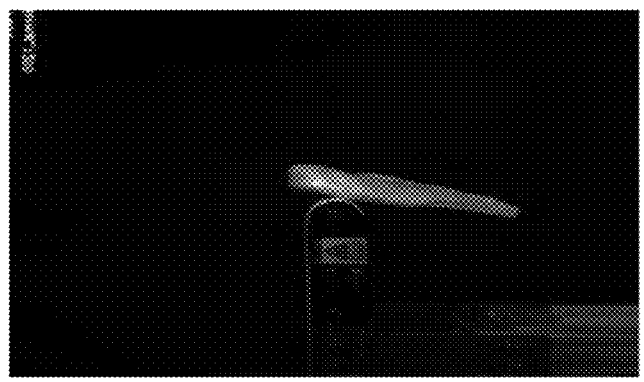
FIG. 5 shows a normal fillet free falling after going over the rounded nose of a conveyor.

Essentially, the inventors have developed multiple potential machine vision inspection systems to separate normal fillets from WB fillets. FIG. 1 generally shows the method and apparatus of the preferred (first) embodiment.

As schematically shown in FIG. 1, in accordance with the first embodiment, the process is initiated when a fillet 22 (preferably with skin side down, caudal end forward) is placed on a proximal end of a conveyor and enters the field of view of a high speed digital camera 26. The high speed camera 26 captures a side-profile image of the fillet 22 on an upper conveyor 24 and communicates the image of the fillet 22 to a controller 30. The position of the high speed camera 26 is essentially at the level of the conveyor 24. When the fillet 22 reaches the rounded intermediate end of the conveyor 34, the fillet 22 bends (i.e. flexes downwardly) as the fillet 22 topples (i.e. falls) onto a lower conveyor 32.

For the purposes of this disclosure, the term "conveyor" means (very broadly) any device capable of moving an item (preferably a boneless chicken fillet) in a selected direction. In the preferred embodiment, the conveyor comprises a conventional conveyor belt system configured so that the fillet rests on top of the conveyor belt as the conveyor belt moves the fillet in a horizontal direction.

Note that, in FIG. 1, for clarity and simplicity, only one fillet 22 is shown in multiple different positions as the fillet 22 proceeds down the conveyor 24. In the preferred embodiment, multiple fillets 22 are placed on the conveyor 24 at about 3 cm apart. Also, in the preferred embodiment, the camera 26 is a digital complementary metal-oxide-semiconductor (CMOS) camera with a resolution of about 1000× 2000 pixels. The camera 26 is continuously acquiring images at up to about 200 frames per second. In alternative embodiments, any camera known in the art capable of performing the required functions can be used in the process. Any combination of lights can be used so long as the illumination is adequate for high-speed imaging of dynamically deforming fillets and their segmentation.

Figure 4:
FIG. 4 shows a normal fillet about half way over the rounded nose of a conveyor.
Figure 3:
FIG. 3 shows a normal fillet starting to go over the rounded nose of a conveyor.
Figure 2:
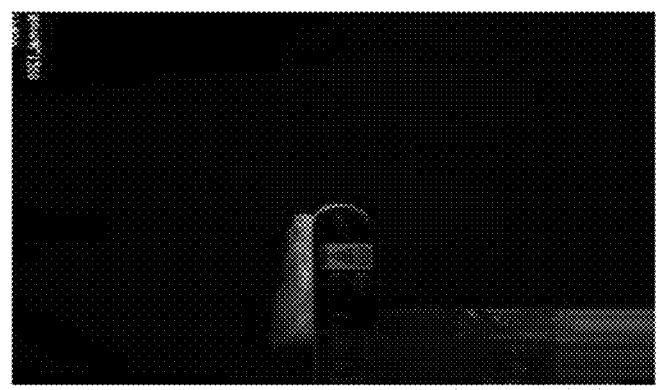
FIG. 2 shows a normal fillet approaching the rounded nose of a conveyor.
Figure 9:
FIG. 9 shows a WB fillet falling after going over the rounded nose of a conveyor.
Figure 8:
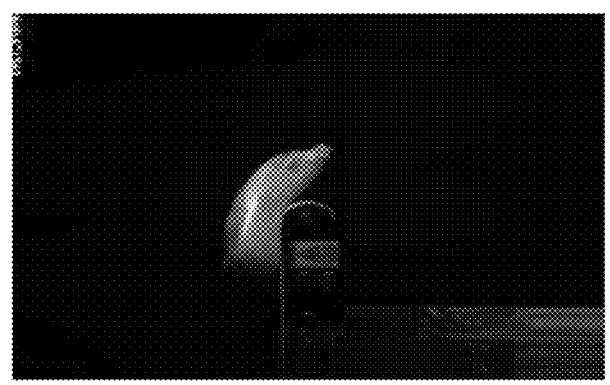
FIG. 8 shows a WB fillet about half way over the rounded nose of a conveyor.
Figure 7:
FIG. 7 shows a WB fillet starting to go over the rounded nose of a conveyor.
Figure 6:
FIG. 6 shows a WB fillet approaching the rounded nose of a conveyor.
Figure 11:
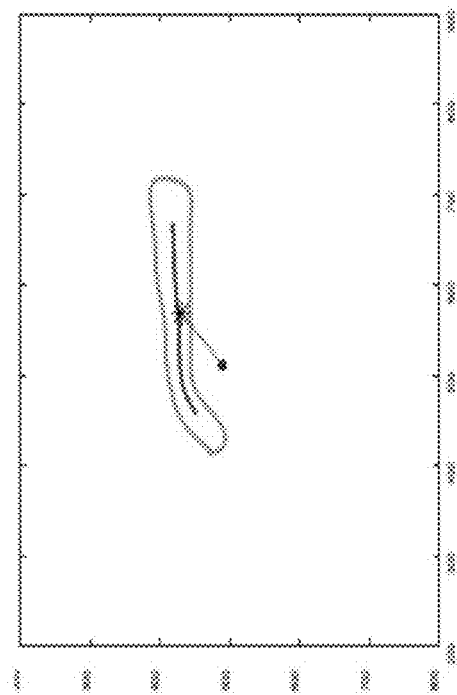
FIG. 11 is a schematic of a normal fillet showing the distance between a reference point and the centroid of the fillet as the fillet is starting to go over the rounded nose of a conveyor.
Figure 13:
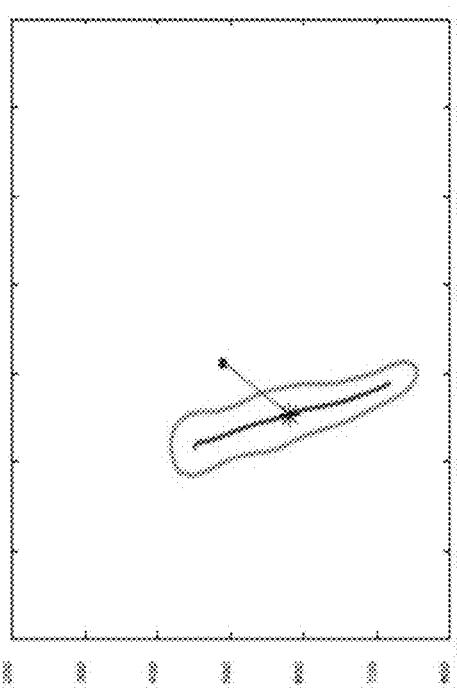
FIG. 13 is a schematic of a normal fillet showing the distance between a reference point and the centroid of the fillet as the fillet is free falling after going over the rounded nose of a conveyor.
Figure 10:
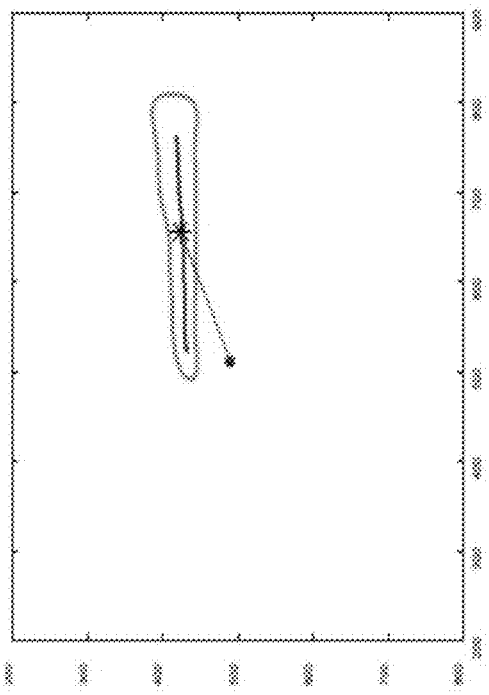
FIG. 10 is a schematic of a normal fillet showing the distance between a reference point and the centroid of the fillet as the fillet is approaching the rounded nose of a conveyor.
Figure 12:
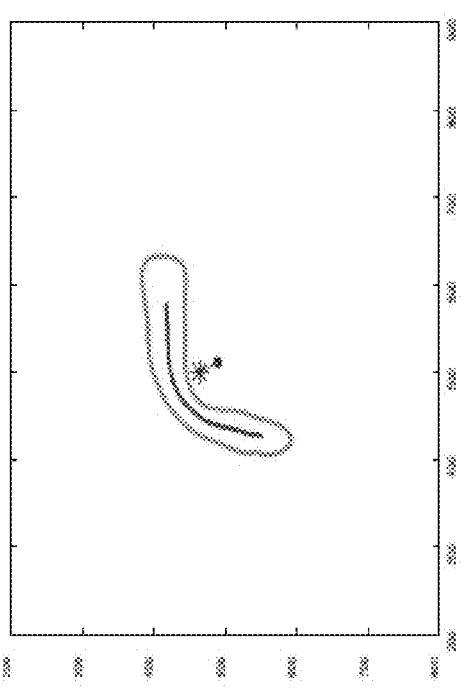
FIG. 12 is a schematic of a normal fillet showing the distance between a reference point and the centroid of the fillet as the fillet is about half way over the rounded nose of a conveyor.
Figure 14:
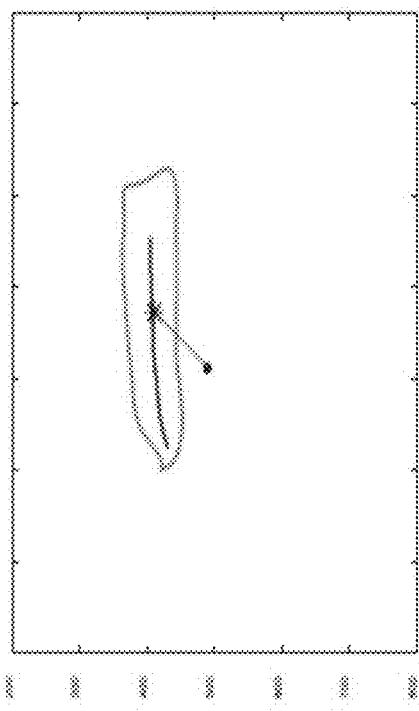
FIG. 14 is a schematic of a WB fillet showing the distance between a reference point and the centroid of the fillet as the fillet is approaching the rounded nose of a conveyor.
Figure 15:
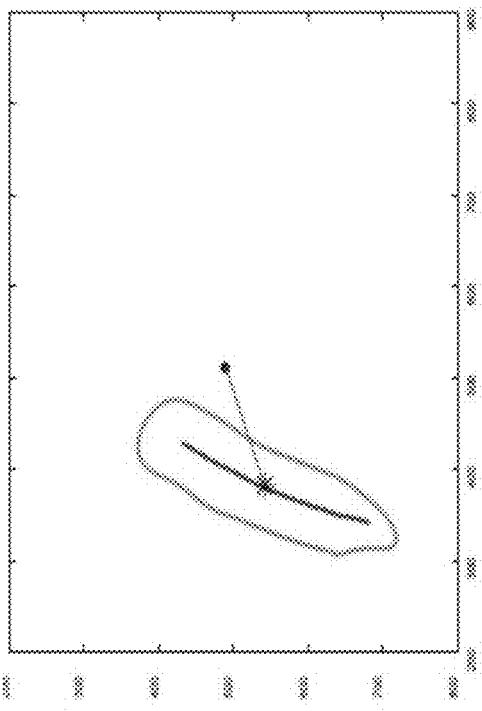
FIG. 15 is a schematic of a WB fillet showing the distance between a reference point and the centroid of the fillet as the fillet is starting to go over the rounded nose of a conveyor.
Figure 16:
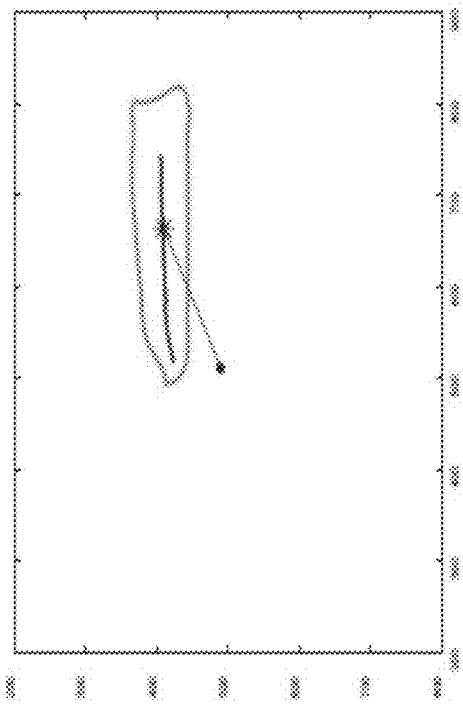
FIG. 16 is a schematic of a WB fillet showing the distance between a reference point and the centroid of the fillet as the fillet is about half way over the rounded nose of a conveyor.
Figure 17:
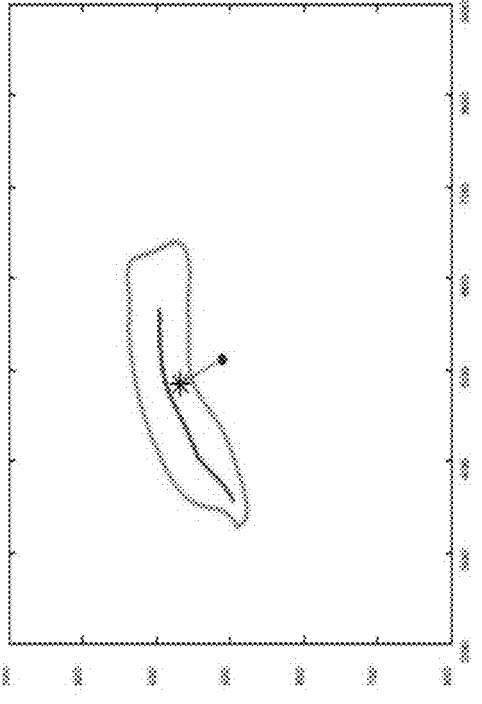
FIG. 17 is a schematic of a normal fillet showing the distance between a reference point and the centroid of the fillet as the fillet is free falling after going over the rounded nose of a conveyor.

The differences between normal and WB fillets are relatively apparent. FIGS. 2-5 show an exemplary normal fillet—while FIGS. 6-9 show a typical WB fillet. The differences between the normal and WB fillets are most clearly seen by comparing FIG. 4 showing a normal fillet with FIG. 8 showing a WB fillet.

Although the differences are apparent, using a machine vision system to characterize the fillets enables quality control personnel to acutomatically, quickly, accurately, and objectively identify poultry breasts that exhibit the WB myopathy. As the fillets 22 proceed down and off the intermediate end of the conveyor 34, digital data gathered by the camera 26 may be processed by the controller 30 using several different techniques to effectively characterize the fillets.

In accordance with the preferred embodiment, using known edge finding techniques, a controller 30 (as schematically shown in FIG. 1) creates a two dimensional digital image/representation of the fillet's profile shape and identifies the fillet's centroid 28 (i.e. approximated center of mass). As the fillet 22 bends over the rounded end 34 of the conveyor 24, the camera 26 records the position and movement of the fillet's centroid 28. For the purpose of this invention, the position of the centroid of an object (such as a fillet) is defined as the arithmetic mean ("average") position of all points in/on the object, assuming that the mass of the object is uniformly distributed within the object profile. Note that for some objects/shapes, the centroid may be outside the profile of the object (for example a torus or a generally U-shaped object).

In this embodiment, the controller 30 records the movement of the fillet centroid 28 relative to a selected reference point 36 (for example, a "rotation origin" or "axis of rotation", see FIG. 1) on the rounded nose 34 of a conveyer 24. FIGS. 10-13 illustrate this movement for a normal breast fillet, where the asterisk represents the fillet centroid 28, and the "dot" represents the reference point 36. The length of the line connecting the asterisk to the dot. i.e the Euclidean distance between the centroid (asterisk) and the reference point (dot), is an indication of the amount of bending deformation (or indirectly, rigidity) of the fillet. In this embodiment, the location of the reference point coincides with the location of the roller axel in the nose of the conveyor belt.

If the fillet is normal, the shape of the fillet will generally conform to the profile of the nose of the conveyor 34. Consequently the distance between the reference point 36 and the fillet centroid 28 will be minimized (when the fillet is fully conformed to the shape of the nose). Note that as the fillet bends, the centroid shifts toward the inside of the bend. As the fillet bends and proceeds over the nose of the conveyor 34, the centroid may move outside the physical profile of the fillet and closer to the reference point in the nose of the conveyor 34.

Figure 18A:
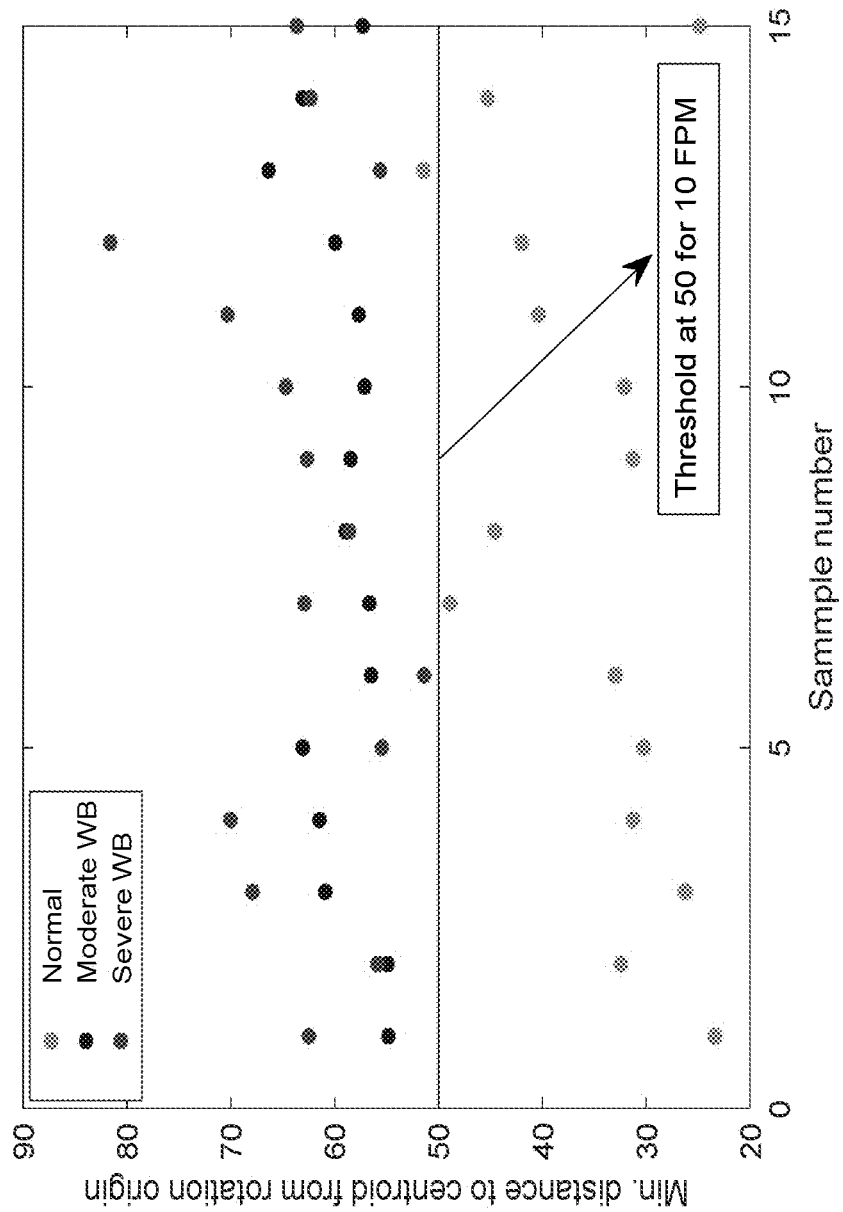
FIG. 18A is a graphical representation of the results of a calibration exercise with 45 boneless chicken breast fillet samples moving on a conveyor at a speed of 10 feet per minute. As the samples moved down the conveyor, a machine vision computer controller calculated the centroid of each fillet. As each fillet moved over the rounded nose of the conveyor and fell off the conveyor, the controller calculated the minimum distance between the conveyor's axis of rotation (i.e. a reference point on the nose of the conveyor) and the centroid of the fillet. The inventors found that when the minimum distance between the centroid and the axis of rotation was less than 50 units, then the fillet was normal. When the minimum distance between the centroid and the axis of rotation exceeded 50 units, then the fillet was almost always a WB fillet.
Figure 18B:
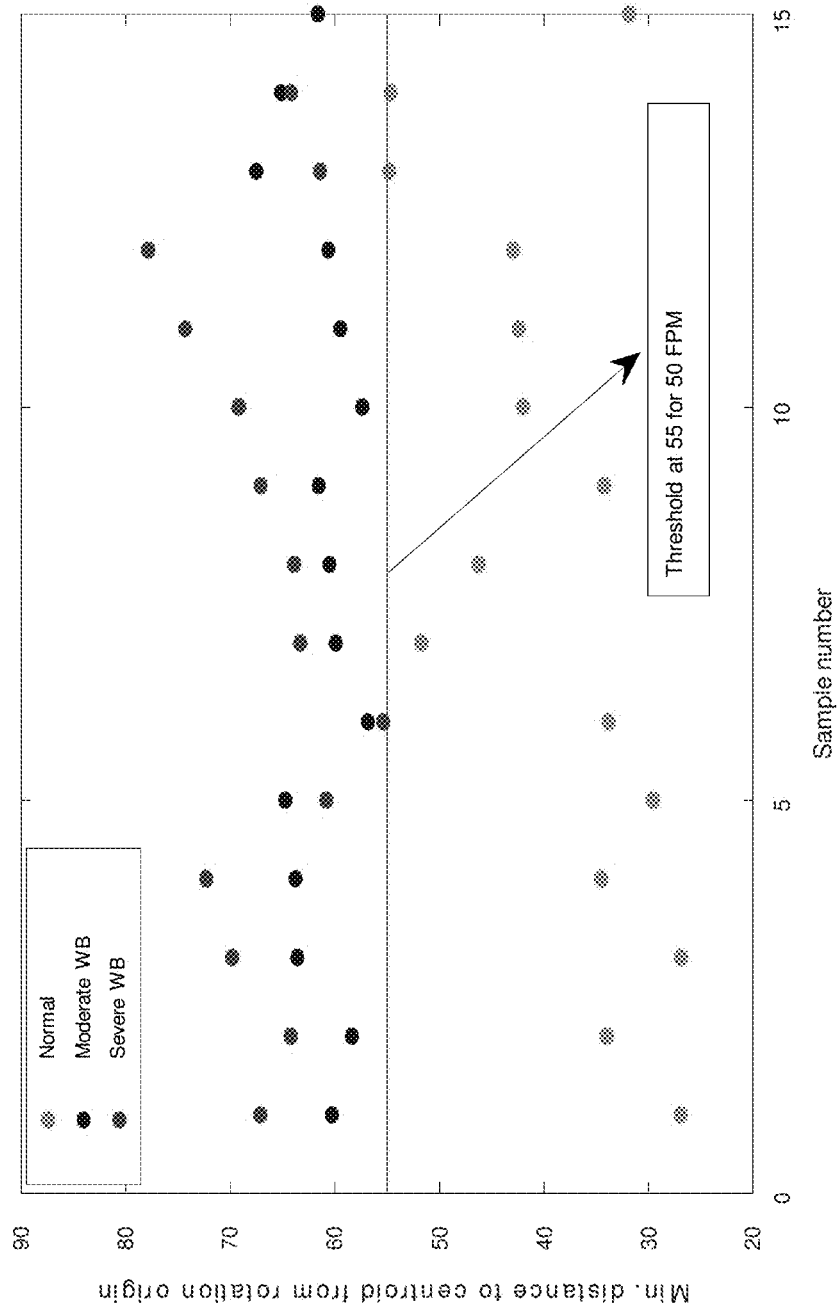
FIG. 18B is a graphical representation of the results of a calibration exercise with 45 boneless chicken breast fillet samples moving on a conveyor at a speed of 50 feet per minute.
Figure 18C:
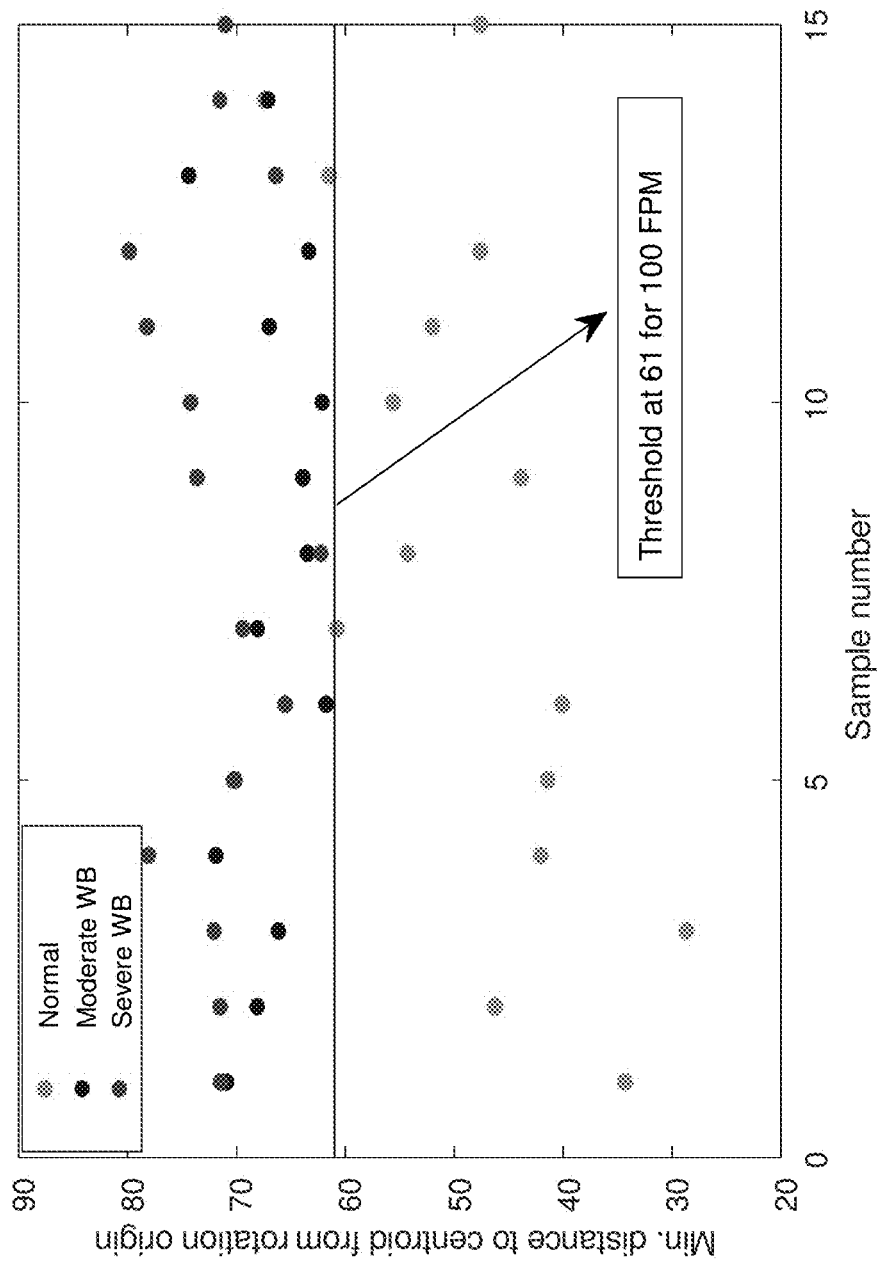
FIG. 18C is a graphical representation of the results of a calibration exercise with 45 boneless chicken breast fillet samples moving on a conveyor at a speed of 100 feet per minute.
Figure 19:
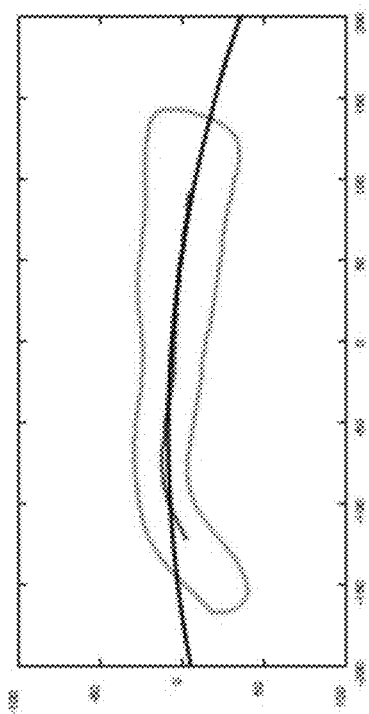
FIG. 19 is a schematic of a normal fillet showing the estimated bending axis associated with a fillet that is approaching the rounded nose of a conveyor.
Figure 20:
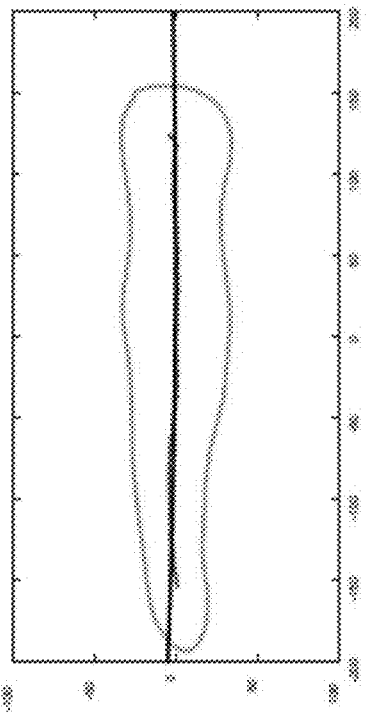
FIG. 20 is a schematic of a normal fillet showing the estimated bending axis associated with a fillet that is starting to go over the rounded nose of a conveyor.
Figure 21:
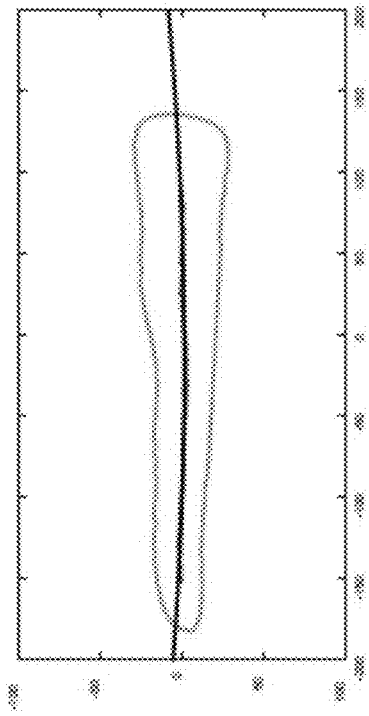
FIG. 21 is a schematic of a normal fillet showing the estimated bending axis associated with a fillet that is about half way over the rounded nose of a conveyor.
Figure 22:
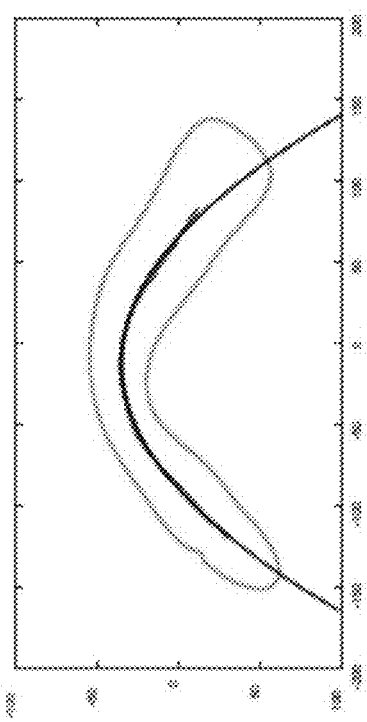
FIG. 22 is a schematic of a normal fillet showing the estimated bending axis associated with a fillet that is free falling after going over the rounded nose of a conveyor.
Figure 24:
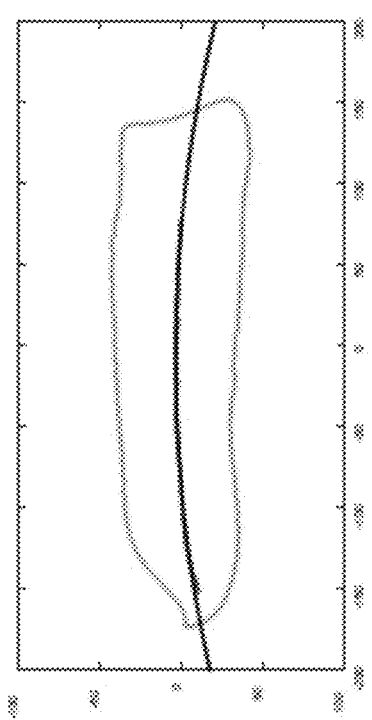
FIG. 24 is a schematic of a WB fillet showing the estimated bending axis associated with a fillet that is starting to go over the rounded nose of a conveyor.
Figure 26:
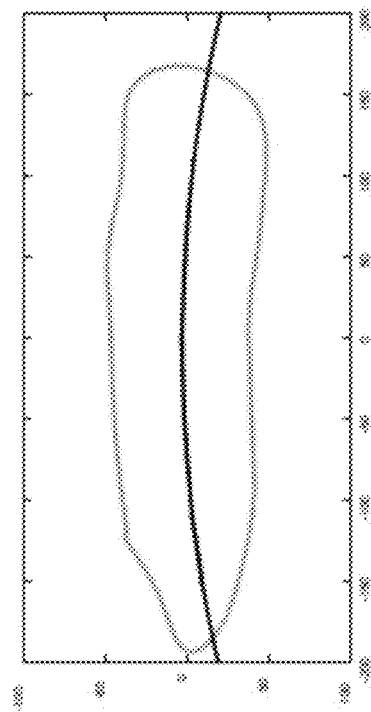
FIG. 26 is a schematic of a WB fillet showing the estimated bending axis associated with a fillet that is free falling after going over the rounded nose of a conveyor.
Figure 23:
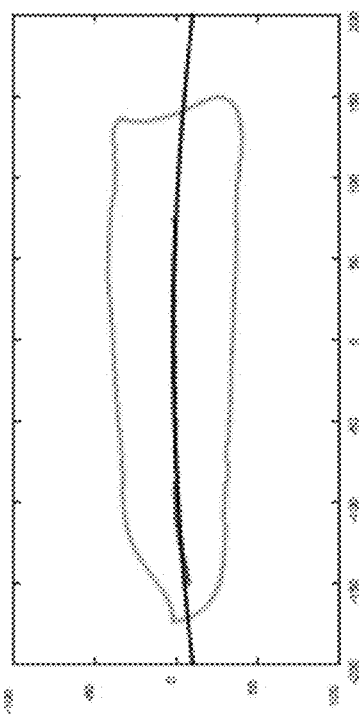
FIG. 23 is a schematic of a WB fillet showing the estimated bending axis associated with a fillet that is approaching the rounded nose of a conveyor.
Figure 25:
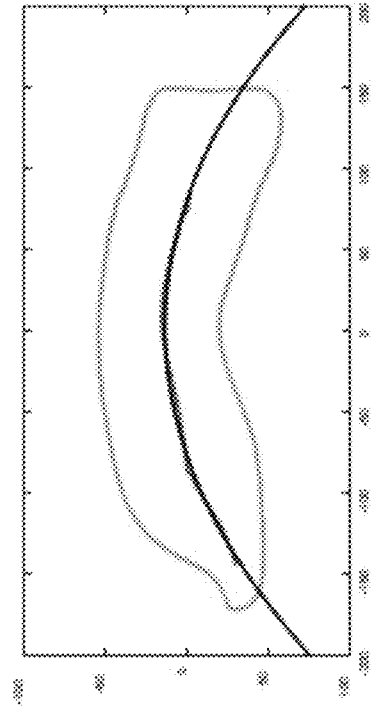
FIG. 25 is a schematic of a WB fillet showing the estimated bending axis associated with a fillet that is about half way over the rounded nose of a conveyor.

By contrast, FIGS. 14-17 show the progression of a WB fillet 22 down and over the nose of the conveyor 34 so that a larger distance between the reference point 36 and the centroid 28 is indicative of less bending (i.e. greater rigidity). The difference between the normal fillet and the WB fillet is most apparent by comparing FIG. 12 to FIG. 16. In accordance with this embodiment, an operator determines the amount of bending of a minimally acceptable fillet. The corresponding minimum distance between the centroid of the fillet 28 and the reference point 36 corresponds with a minimally acceptable distance (that can be used as an indirect indicator of fillet rigidity). Fillets that exhibit centroids with greater than the minimally acceptable distance are designated as WB fillets. FIGS. 18A-18C shows an example of the results of a calibration exercise to determine the minimally acceptable distance between the conveyor nose reference point 36 and the centroid 28.

In an alternative embodiment, the controller 30 compares the movement and disposition (as digitally acquired and recorded) of a selected fillet's 22 profile and centroid 28 as the fillet 22 proceeds over the rounded nose of the conveyor 34. The digitally recorded path is electronically compared to a pre-selected profile for a normal breast. The selected fillet is determined to be (or not to be) normal based on how well the selected fillet conforms to the movement and disposition of the preselected profile.

In accordance with the second embodiment, the "bending energy" of a fillet profile (i.e. a fillet's shape contour) is calculated and compared to a predetermined threshold to distinguish between normal and WB fillets. For example, FIGS. 19-22 show the progression of the normal fillet (also shown in FIGS. 10-13) down and over the nose of a conveyor 34, where the estimated bending axis (i.e. neutral axis undergoing neither tension nor compression) is shown. Note that the FIG. 1 drawings are equally applicable to the first and second embodiments. Bending axis may be used in describing the fillet profile's deflection distance, curvature, deflection angle, and bending energy. Bending energy of a two-dimensional object is one possible parameter that may be used to describe the energy stored in the object's shape countour.

For the purposes of this disclosure, "bending energy" is defined as the normalized sum of squared curvatures. For example:

$$BE = \frac{1}{L}\sum_{k=1}^{L} C^2(k)$$

Where C is a curvature at each pixel along the boundary of the fillet profile and L is the number of the calculated curvature values. Curvature characterizes the amount by which a curve (bending axis here) deviates from being a flat horizontal line.

A decision regarding whether a fillet is a WB fillet may also be made based on the bending angle exhibited by the fillet before fillet topples off of the conveyor. The "bend angle" may be comprised of the maximum angle between a front portion of the fillet as the fillet moves over the nose end of the conveyor, and the rear portion of the fillet as the fillet rests on the conveyor just before the rear portion of the fillet rises (or otherwise moves) relative to the conveyor as the fillet topples off the end of the conveyor.

FIGS. 23-26 show the progression of the WB fillet (also shown in FIGS. 14-17) down and over the nose of a conveyor. This embodiment focuses on the magnitude of energy stored in the estimated bending axis. The greater the fillet bending, the more the bending axis will devitate from the flat line. For example, the normal fillet in FIG. 20 exhibits a bending energy of about 22.6 per unit length, while WB fillet in FIG. 24 exhibits a bending energy of about 8.3 per unit length. In this embodiment, fillets that exhibit less than a pre-determined threshold of bending energy are designated WB fillets.

Figure 29:
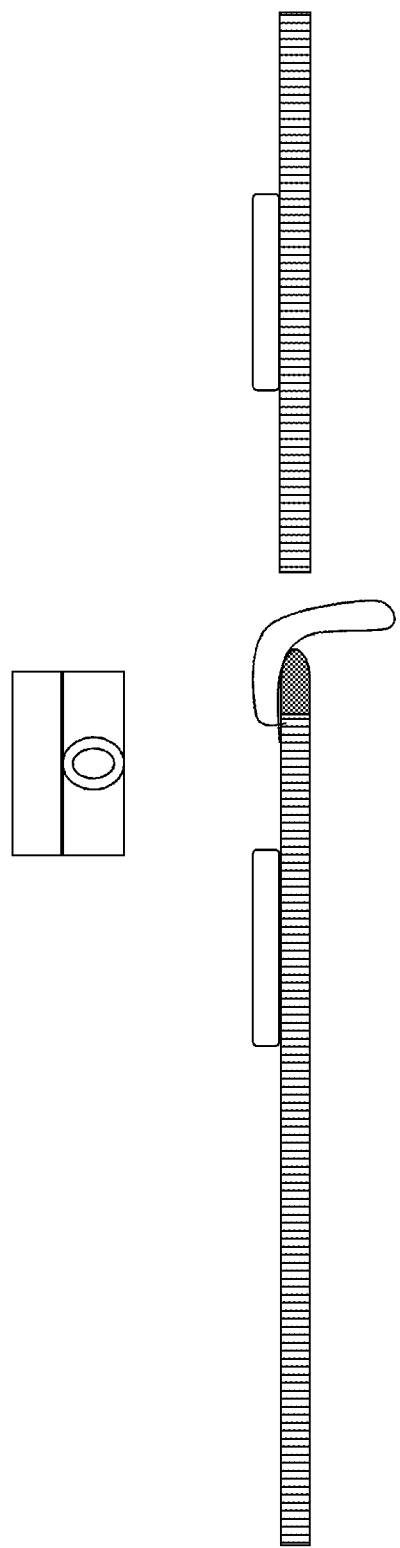
FIG. 29 comprises an alternative embodiment.

Additionally, multiple variations of the first and second embodiments should also be considered within the scrope of this disclosure. Rather than having an end or "drop off" of the upper conveyor, the upper conveyor may have other anomalies or discontinuities so that the digital camera system tracks how the fillet conforms (or doesn't conform) to the anomaly. For example, as shown in FIG. 29, there may be a gap in a selected location in the conveyor so that the flexibility of a normal breast will allow the breast to sag or to actually slip into the gap whereas a WB breast would bridge the gap and continue along the conveyor. Alternatively, a normal breast would cause the breast to sag or to drop into the gap as the breast moves along the conveyor.

Figure 30:
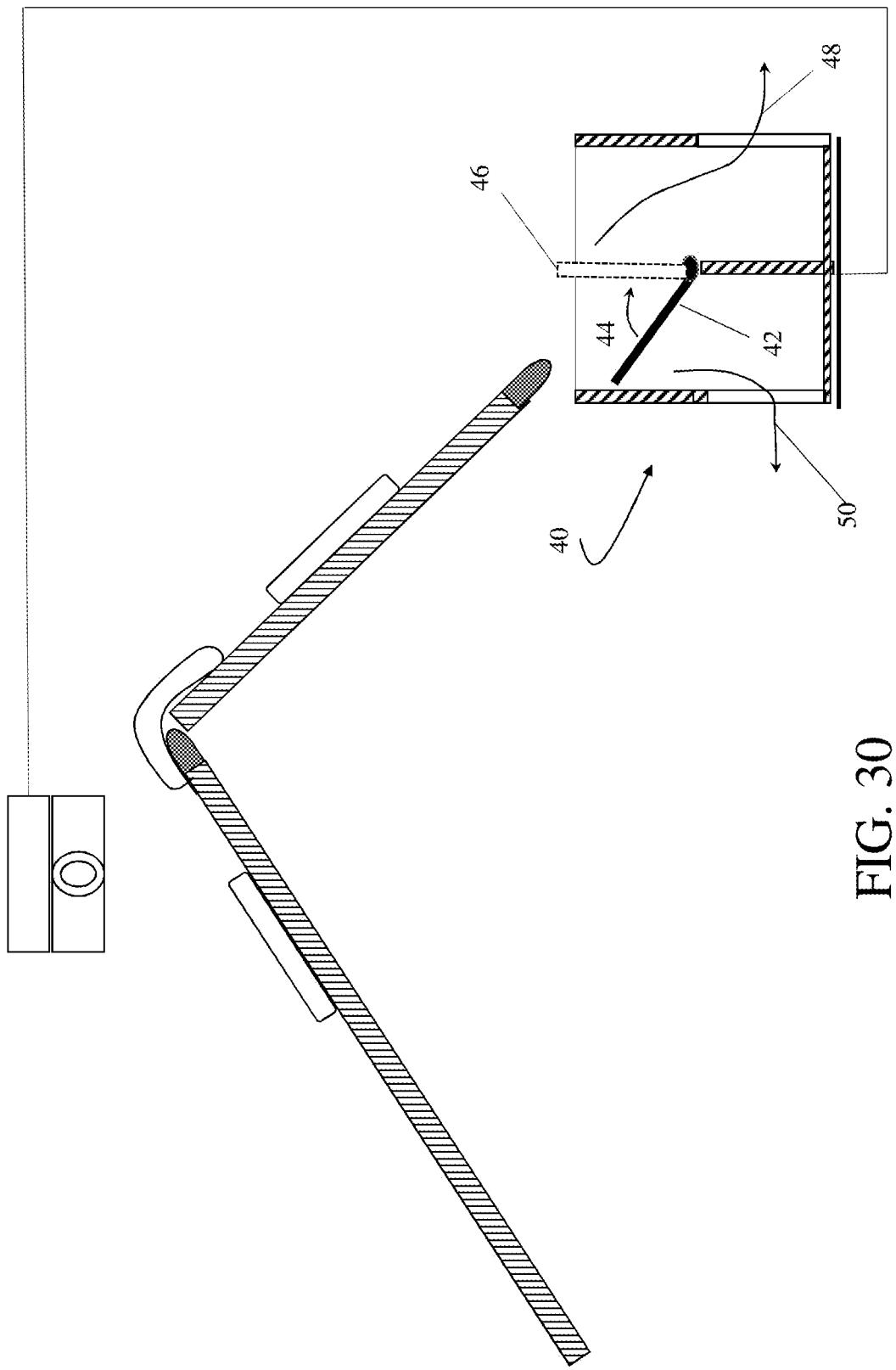
FIG. 30 comprises a further alternative embodiment.

Alternatively, as shown in FIG. 30, the conveyor may have an inverted "V" or "U" shape so that the fillets are tracked as they go over the apex of the conveyor and consequently the fillets do not actually fall off of the upper conveyor. In further alternative embodiments (not shown), the conveyor may have a non-inverted "V" or "U" shape, or the conveyor may have any other shape designed to reveal the flexibility/rigidity of the fillets.

Figure 28:
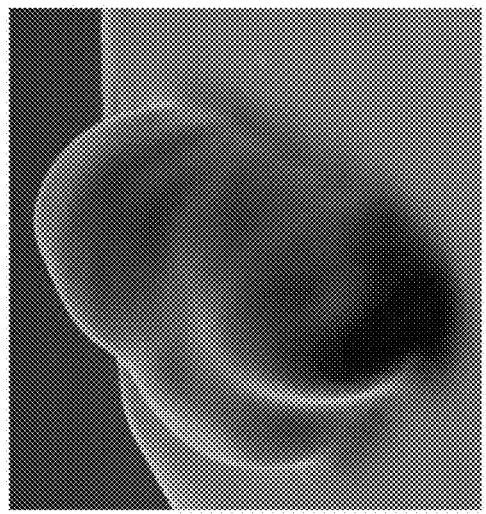
FIG. 28 is a three-dimensional scan of the upper surface of a WB fillet.
Figure 27:
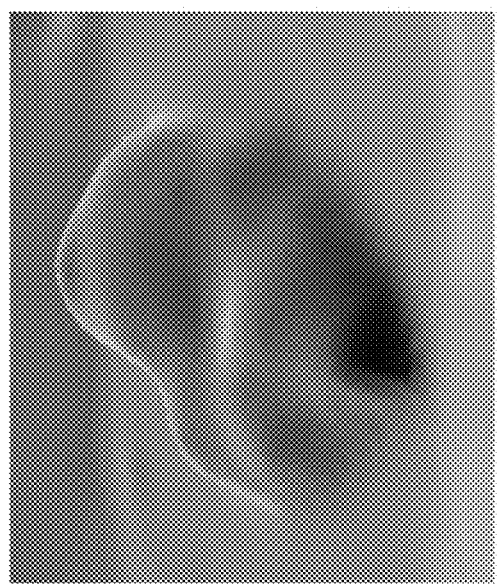
FIG. 27 is a three-dimensional scan of the upper surface of a normal fillet.

In third embodiment, the inventors focused on the fillet shape (or profile) and the generally rounded projections (i.e. "bulgy projections") apparent in cross-sectional profiles on the caudal end of a fillet. These "bulgy" projections tend to be more pronounced in WB fillets. For example, FIG. 27 shows a typical normal fillet while FIG. 28 shows a typical WB fillet.

In accordance with this embodiment, fillets on a flat conveyer belt are subjected to a three-dimensional scan or a two-dimensional profile scan. With a three-dimensional scan, the bulgy projection area is compared to the relatively flat surface of the fillet so that a ratio is established (bulgy projection/total fillet upper surface area). A ratio (that may be expressed as a percentage) threshold is then established. Fillets having a ratio exceeding the threshold are designated as WB fillets. With a two-dimensional profile scan using the system in FIG. 1 while the skin-side of a fillet is preferably down on the conveyor, a cross-sectional profile of a fillet can be imaged and utilized to characterize the bulginess of a fillet by measuring the thickness of the bulgy area.

At the end of the inspection process, a system to sort the normal fillets from the WB fillets can be positioned or below the lower conveyor as the fillets exit the camera field of view. The sorting system generally receives information from the controller that allows the sorting system to segregate the fillets based on the decision output from a controller. Alternatively, as shown in FIG. 30, the fillets may drop directly from the conveyor and into a vertical sorter 40 that is in communication with the controller.

The vertical sorter 40 may comprise a moveable guide/flapper valve 42 that moves in the direction of the arrow 44 from the angled position shown in FIG. 30 to the vertical position shown as the dashed line 46. By selectively moving the flapper valve 42, the controller 30 sorts the fillets as they come off of the conveyor. When flapper valve 42 is in the angled position, the fillets are directed to in the direction of the arrow 48. When the selector valve is in the vertical position, the fillets are directed in the direction of the arrow 50. The sorting system may comprise any configuration known in the art so long as the WB fillets are effectively diverted off of the conveyor belt or otherwise effectively separated from the normal fillets.

DESCRIPTION OF THE METHOD

The preferred embodiment (i.e. the first embodiment as described above) comprises a method wherein fillets are accepted or rejected based on a measured distance between a fillet centroid and an axial reference point (as shown in FIGS. 1-5 and 10-13).

1. Prior to running an inspection system operation, a calibration without fillets is required. This calibration determines the background image, and sets the image trigger lines which are the frame pixel locations where images start being processed and where images stop being processed. During the image processing period, the shape of the fillet is detected and monitored. The location of the conveyor "rotation origin" or "axis of rotation", (i.e. an "axial reference point") is selected based on observations during calibration.

2. Processing starts as a fillet travels down the conveyor and enters the camera field of view.

3. The camera is in a fixed position perpendicular to the travel of the fillets on the conveyor and does not move. The camera continuously captures images but does not save or process any images until a fillet enters the field of view and reaches the first image trigger line.

4. An image-based trigger is a column of pixels in an image that is triggered when a certain number of pixels in that column exceed a set threshold. These are determined during calibration (step 1.). The first image-trigger line is positioned vertically above a point near the end of the upper conveyor such that only a fillet with a predetermined thickness will cause a trigger event. This point is adjustable and is the starting point for analyzing a fillet. When this trigger event detects a newly arrived fillet in the field of view, the image of the entire profile of the fillet is recorded as the first appearance among the series of images to track until the ending trigger event is activated for the same fillet.

5. When the image trigger is set, the computer/controller starts processing camera images. Using common image-processing routines, the controller then segments the fillet portion of the image from everything else. The preferred method for fillet (foreground) image segmentation is to remove the background and conveyor with a simple intensity-based threshold operation.

6. The boundary (i.e. profile) of the segmented fillet image is then calculated/defined with a common image processing routine.

7. From this boundary image, a common image-processing routine calculates a centroid of the segmented fillet image in an x,y coordinate system. There are multiple routines to calculate centroids and some (e.g. average of all pixel coordinates within the segmented foreground object) do not require an operater to first calculate a boundary image (step 6), but this is the preferred method (average of boundary coordinates).

8. The distance between the centroid location and the fixed location of the conveyor roller axle/axial reference point (per step 1) is calculated for the image. This distance is saved by the controller/computer processor.

9. Steps 5 through 8 are repeated for every image-capture event. The number of images captured varies depending on the conveyor speed, size of fillet, camera properties, and image-trigger locations. It is important that images with sufficient resolution and frequency are captured. This capture process is repeated while fillets continue down the conveyor and drop off the end and down to a lower conveyor.

10. A second image-based trigger is defined horizontally in the image approximately ⅔ down the camera field of view on the lower conveyor. Thus, when a fillet reaches this point, the image processing for a fillet stops. Recall that image capture never stops, but image processing of a particular fillet will stop. In real-time imaging inspections, it is also important to avoid a delayed transmission of an output decision signal from a controller to a sorter system by ensuring that this second trigger event happens within a time budget after the first trigger event is (e.g. about 0.5 seconds for a fillet with 8-inch length and 2-inch gap at the line speed of 100 ft/min).

11. This method does not require that only one fillet be in an image at a time as each fillet segment (step 5) is processed independently.

12. For a fast line speed of 100 ft/min, the number of images captured and analyzed for each fillet is about 90 at 200 Hz frame rate and an equal number of distance measurements are calculated and temporarily saved.

13. Once the image processing has stopped for a given fillet with the second image trigger event, the smallest minimum distance is determined from all the calculated distances among the images processed between the first and second trigger events (step 8).

14. A WB threshold, which is based on the smallest minimum distance from step 13, is then used to activate the down-line sorting system to allow normal fillets to continue but divert fillets with the WB myopathy. If the minimum distance is greater than the threshold value, the fillet is designated as a WB fillet. If the minimum distance is less than the threshold, then the fillet is considered normal.

15. A timing device is used to coordinate the output of step 14 and the sorting system such that the correct fillet is sorted upon arrival at the sorting system. Coordination of the ouput signal with a sorter is also necessary. Timing (synchronization or delay) may also be done via software in the controller—although it is less accurate than a hardware device.

EXAMPLES

A conveyor belt-type poultry inspection line (generally configured as shown in FIG. 1) was used to inspect chicken fillets for WB myopathy. The test inspections were conducted at varying line speeds. FIG. 8A shows the minimum distance to the centroid from the rotation origin at a speed of 10 ft/min. FIG. 8B shows the minimum distance to the centroid from the rotation origin at a speed of 50 ft/min. FIG. 8C shows the minimum distance to the centroid from the rotation origin at a speed of and 100 ft/min. Test inspections were also conducted at 20 ft/min speed increments from 100 ft/min upto 260 ft/min. The tests were configured so that fillets moved along an upper conveyor operated on a horizontal plane with fillets moving along in a single-file mode. A camera was positioned perpendicular to the direction of movement of the objects on the conveyor belt. Consequently the field of view included a side-view of fillets on the conveyor, and the space below the upper conveyor (in-line with a lower conveyor).

The preferred camera field of view was at least 50 cm (horizontal)×30 cm (vertical) at the working distance measured from the camera lens to the center of the fillet width. The camera used for the test was a Pointgrey Grasshopper U3-2356C color camera (configured to 960×600 pixels) with a 6-mm focal length lens with a working distance of about 50 cm from the center of the fillet to the camera lens, resulting in a 64 cm (horizontal)×38 cm (vertical) field of view.

The inventors selected this configuration after an extended trial and error process that included multiple lenses and focal distances. Camera exposure time was less than 5 ms resulting in a frame rate of 200 frames/sec or faster. Color images were acquired but converted to monochromatic images for subsequent image processing and analysis. Thus, the inventors determined that a monochromatic camera would work equally as well. The camera image was essentially centered on the apex of the conveyor belt at the end roller. A matte black background (fabric) was positioned on the other side of the conveyor and extended beyond the conveyor so that it covered the entire field of view of the camera.

Lighting (LED white light) of sufficient intensity was used to allow for fast capture of moving fillets (short exposures with miminal moiton blur). A black background was placed behind the conveyor to help with image contrast. Lights were positioned beside the camera providing frontal illumination of the space traversed by the fillets (i.e. the lights illuminated the area around the nose of the upper conveyer and a lower conveyer area where the fillets land). The inventors used two 25×25 cm white LED area lights. However, any combination of lights can be used that provide adequate illumination of fillet at the required exposure time.

The fillet samples were labelled with hand inspection into three classes (normal, moderate WB, and severe WB). Both cranial and caudal areas of the severe WB fillets were hardened whereas only cranial areas of the moderate WB fillets were hardened. Note that normal fillets were free of hardened areas and not rigid and had no bulges. However, moderate WB fillets were overall less rigid and bulged than the severe WB fillets.

The detection performance of the system was measured with classification accuracy by calculating the ratio (i.e. percentage) of correct predictions in detecting normal fillets. At 10 ft per min the system was about 98% accurate confirming with the hand inspection. However, as the line speed increased, the accuracy decreased until at 100 ft per min the accuracy decreased to 96%. The threshold values for best classification at different line speeds were changed because the baseline was shifted upward and the range of observed rigidity decreased as the speed increased. FIG. 18A-18C show the system performance at 10, 50, and 100 feet per minute, where optimal threshold values were differently set. The line speed was further increased from 100 ft per min until 260 ft per min with an increasing step of 20 ft per min. At speeds beyond 160 ft per min, the range of the distance measurements was decreased down to an unacceptable level.

For the foregoing reasons, it is clear that the method and apparatus described herein provides an innovative WB fillet inspection and separation system. The current system may be modified in multiple ways and applied in various technological applications. The invented method and apparatus may be modified and customized as required by a specific operation or application, and the individual components may be modified and defined, as required, to achieve the desired result.

Although the materials of construction are not described, they may include a variety of compositions consistent with the function described herein. Such variations are not to be regarded as a departure from the spirit and scope of this invention, and all such modifications as would be obvious to one skilled in the art are intended to be included within the scope of the following claims.

The amounts, percentages and ranges disclosed herein are not meant to be limiting, and increments between the recited amounts, percentages and ranges are specifically envisioned as part of the invention. All ranges and parameters disclosed herein are understood to encompass any and all sub-ranges subsumed therein, and every number between the endpoints. For example, a stated range of "1 to 10" should be considered to include any and all sub-ranges between (and inclusive of) the minimum value of 1 and the maximum value of 10 including all integer values and decimal values; that is, all sub-ranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of properties such as distance, time conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. As used herein, the term "about" refers to a quantity, level, value, or amount that varies by as much 10% to a reference quantity, level, value, or amount.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein). The invention illustratively disclosed herein suitably may be practiced in the absence of any element which is not specifically disclosed herein.

What is claimed is:

1. A method of sorting poultry meat, the steps of the method comprising:
   (a) placing a boneless poultry breast fillet on a conveyor;
   (b) acquiring digital images of the fillet as the conveyor moves the fillet, and transmitting the images to a controller;
   (c) a using the digital images transmitted to the controller to calculate physical characteristics of the fillet;
   (d) directing the fillet to an end of the conveyor so that the fillet proceeds off an end of the conveyor;
   (e) using the controller to make a decision regarding whether the fillet has WB myopathy based on:
   (i) a position of a fillet centroid calculated by the controller, the decision in step (e) is made by the controller based on whether a distance between a reference point and the centroid of the fillet exceeds a predetermined minimum threshold distance; or,
   (ii) a bending energy of the fillet calculated by the controller, the decision in step (e) is made by the controller based on a magnitude of bending energy calculated for the fillet; or,
   (iii) a bend angle of the fillet calculated by the controller, the decision in step (e) is made by the controller based on a magnitude of the bend angle calculated for the fillet; or,
   (iv) a three dimensional image evaluated by the controller, the decision in step (e) is made by the controller (at least in part) based on the presence or absence of bulges in the images of the fillet.

2. The method of claim 1 wherein the reference point in step (e)(i) is a point located in a nose of the conveyor.

3. The method of claim 2 wherein the reference point coincides with a location of a roller axel in the nose of the conveyor belt.

4. The method of claim 1 wherein multiple fillets are continuously processed in series.

5. The method of claim 1 wherein the conveyor is angled upwardly.

6. The method of claim 1 wherein, the conveyor is angled upwardly so that the conveyor has an inverted "V" or "U" shape, the end of the conveyor comprising a vertical peak of the conveyor, so that after the fillet proceeds off the end of the conveyor, the fillet is deposited on a downwardly angled conveyor.

7. The method of claim 1 wherein, in step (d), the end of the conveyor comprises a gap in the conveyor so that in step (e) the decision is made by analyzing how the fillet responds to the gap.

8. The method of claim 1 wherein after the fillet proceeds off of the end of the conveyor, the fillet drops down to a lower conveyor where the WB fillets are eventually separated from the normal fillets.

9. The method of claim 1 wherein after the fillet proceeds off of the end of the conveyor, the fillet drops directly into a diverter that is in communication with the processor so that the diverter separates the WB fillets from the normal fillets.

10. A system for determining whether a fillet has WB myopathy, the system comprising:
    a conveyor configured to transport at least one fillet, the conveyor having an end followed immediately by a vertical drop;
    a camera configured to acquire digital images of the fillet as the fillet is transported by the conveyor; and,
    a controller configured to receive digital images from the camera and calculate physical characteristics of the fillet;
    wherein, as the fillet is transported down the conveyor and off of an end of the conveyor, the controller processes the digital images of the fillet and evaluates the changes in the fillet by evaluating at least one of: (a) the movement of the filet centroid: or, (b) fillet bending energy; or, (c) fillet bending angle; or, (d) a presence and form of subtle bulges in fillet topography, and makes a decision regarding whether the fillet has WB myopathy based on the evaluation of the fillet.

11. The system of claim 10 wherein the conveyor is essentially level and the system further comprises a lower conveyor so that the fillet proceeds off the end of the conveyor and falls onto a lower conveyor.

12. The system of claim 11 further comprising a diverter in communication with the controller, the fillet being transported down the lower conveyor so that the WB fillets are separated from the normal fillets by the diverter.

13. The system of claim 10 wherein the conveyor is angled upwardly so that the conveyor has an inverted "V" or "U" shape, the end of the conveyor comprising a vertical peak of the conveyor, so that after the fillet proceeds off the end of the conveyor, the fillet is deposited on a downwardly angled conveyor.

14. The system of claim 10 wherein the end of the conveyor comprises a gap in the conveyor so the decision is made by analyzing how the fillet responds to the gap.

15. The system of claim 14 wherein the gap is structured so that normal fillets fall off of the conveyor and into the gap, and WB fillets bridge the gap and continue on the conveyor.

* * * * *